Feb. 20, 1934.   L. A. CORNELIUS   1,947,581
FITTING
Filed Sept. 3, 1932

Witness:
Geo. L. Chapel

Inventor
Louis A. Cornelius

By Rice and Rice, Attorneys

Patented Feb. 20, 1934

1,947,581

UNITED STATES PATENT OFFICE 1,947,581

FITTING

Louis A. Cornelius, Grand Rapids, Mich., assignor to Wolverine Brass Works, Grand Rapids, Mich., a corporation of Michigan Application September 3, 1932. Serial No. 631,618

2 Claims. (Cl. 285—115)

The present invention relates to fittings and more particularly to improvements in solder fittings of the general character secured by capillary attraction of a liquid sealing material and as illustrated on pages 114-115 of the copyrighted catalogue issued by my assignee, Wolverine Brass Works, Grand Rapids, Michigan, copyrighted 1914, Copyright Certificate No. C I A 374,985.

The main objects of the invention are to provide a fitting adapted to telescopingly receive and secure therewith a second member or members; to provide such a fitting adapted to secure a second member or members therewith against displacement under lateral expansion and contraction of the assembled parts; to provide novel and convenient means for effecting such telescoping engagement of the several parts; to provide a fitting having improved means for securely uniting a second member or members therewith by means of a sealing material; to provide a fitting having improved means for effectively causing a liquid sealing material to flow within the grooves between the contacting portions of the assembled parts; to provide such a fitting particularly adapted for use in the securing of thin metal tubing therewith; and, to provide a fitting and fitted member or members which in this assembled relation provides an effective joint against external and internal pressures.

An illustrative embodiment of the invention is shown in the accompanying drawing, wherein.

Figure 1:
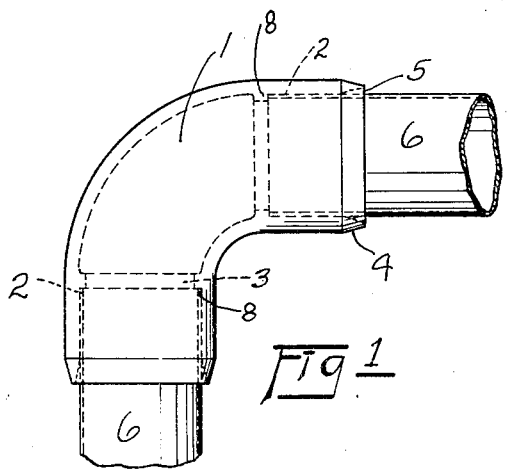
Figure 1 is a view of an L-type tubular fitting, showing one of the many ways in which the invention herein may be utilized.
Figure 5:
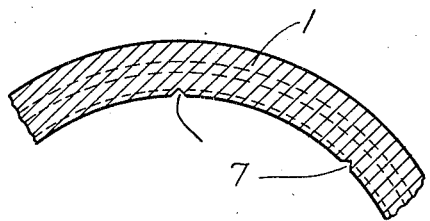
Figure 5 is an enlarged fragmentary cross sectional view of a portion of the fitting.
Figure 3:
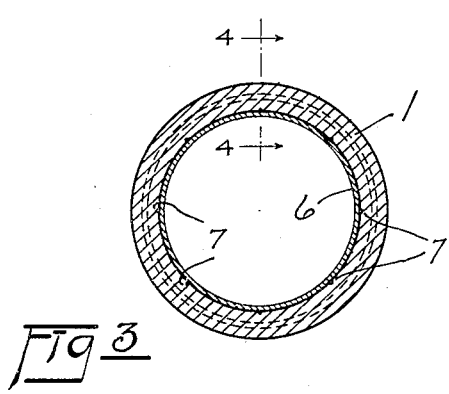
Figure 3 is a sectional view taken on line 3—3 of Figure 2.
Figure 2:
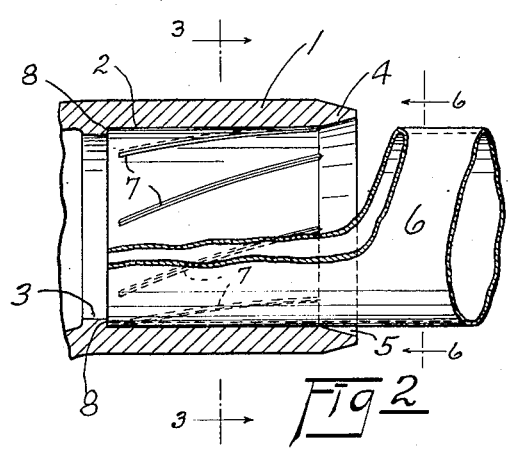
Figure 2 is an axial sectional view of a fitting here shown as tubular in form and partly broken away to indicate any of the several types of fittings such as T's, L's, etc. and showing further the fitting when used in conjunction with a tubular member which is likewise here shown as broken away to better show the method of sealing the several parts in their assembled relation.
Figure 4:
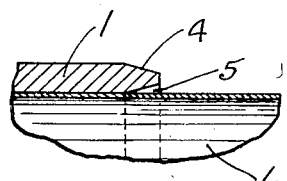
Figure 4 is a sectional view taken on line 4—4 of Figure 3.
Figure 6:
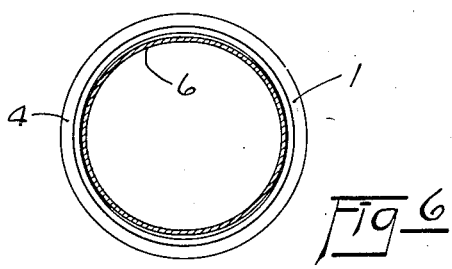
Figure 6 is a sectional view taken on line 6—6 of Figure 2.

The fitting herein shown and described is particularly adapted for use as a coupling for uniting one or more tubular members and may be in the form of a T union, L union, plug union, etc. as indicated in Figure 2. The fitting may likewise be bored or reamed to form a socket to telescopingly receive and secure therewith rods, tubular pipe, etc.

Referring to the drawing in which like parts are designated by the same numerals in the several views, the fitting 1, here shown as a tubular conduit, is bored or reamed to form a receiving socket 2 as distinguished from the non-bored portion 3 of the conduit and its outer end 4 is provided with a tapered flared opening 5 adapting the fitting to more readily telescopingly receive a second member 6 here shown as thin metal tubing, particularly in instances wherein the end of the thin metal tubing is expanded or formed out of round shape.

The receiving socket is provided with a plurality of internal grooves 7 here shown as helical in form and extending lengthwise inwardly from the end thereof and likewise here shown as extending short of the shoulder 8 adapting the fitting to receive and retain a sealing material such as liquid solder poured through the flared opening 5 for securing the second member within the socket against the shoulder 8 and preventing leakage of the sealing material beyond said shoulder. These grooves may of course be linear in form and they may likewise extend the full length of the socket, particularly in instances where the fitting is used in uniting a rod or other non-tubular member.

It will thus be seen that the second member may be readily and conveniently telescopingly received within the flared end of the socket of the fitting and when thus assembled, the liquid sealing material poured at the flared opening will readily flow into the several grooves and spread therefrom by capillary attraction between the contacting portions of the assembled parts as will be apparent to those skilled in the art. Because of the helical sealing material receiving grooves, the several parts are secured together against lateral expansion and contraction and against external and internal pressures and a fitting is thus provided which is particularly adapted for use in the securing of thin metal tubing therewith.

While but one specific embodiment of this invention has been herein shown and described, it will be understood that numerous details of the construction shown may be altered or omitted without departing from the spirit of this invention as defined by the following claims.

I claim:

1. A joint connection comprising, a socket member and a member adapted to be telescopically received into said socket member, the socket member being provided with a flared opening, which opening acts as a guide for the member to be telescoped into said socket and also as a receiving and distributing chamber for a sealing fluid, said socket having a plurality of internal grooves communicating with and extending lengthwise inwardly from the flared opening, whereby when the sealing fluid is introduced into said flared opening the sealing fluid will flow into the said grooves lengthwise of the connection and by capillary action spread in a film about the portions of the telescoped connection.

2. A joint connection comprising, a socket member, and a member adapted to be telescopically received into said socket member, the socket member being provided with a flared opening, which opening acts as a guide for the member to be telescoped into said socket and also as a receiving and distributing chamber for a molten sealing compound, an annular internal shoulder in said socket member spaced inwardly of the flared opening serving to receive the second mentioned member thereagainst in abutting relationship, said socket member having internal helical grooves extending lengthwise inwardly from the flared opening to a point short of said shoulder, whereby when the sealing compound is introduced into said flared opening the sealing compound will flow into the said grooves lengthwise of the connection and by capillary action spread in a thin film about the portions of the telescoped connection.

LOUIS A. CORNELIUS.